(12) United States Patent
Tamaoki et al.

(10) Patent No.: US 9,561,824 B2
(45) Date of Patent: Feb. 7, 2017

(54) VEHICLE-BODY FRONT STRUCTURE

(71) Applicant: TOYOTA JIDOSHA KABUSHIKI KAISHA, Toyota-shi (JP)

(72) Inventors: Akihiro Tamaoki, Tajimi (JP); Kosuke Sakakibara, Toyota (JP); Masanobu Omi, Kasugai (JP); Tomoyuki Kuriyama, Toyota (JP); Wataru Kawashima, Nissin (JP); Motoyuki Tanaka, Toyota (JP); Nobuaki Kitaura, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/894,471

(22) PCT Filed: Oct. 2, 2013

(86) PCT No.: PCT/JP2013/076847
§ 371 (c)(1),
(2) Date: Nov. 27, 2015

(87) PCT Pub. No.: WO2014/192176
PCT Pub. Date: Dec. 4, 2014

(65) Prior Publication Data
US 2016/0121931 A1    May 5, 2016

(30) Foreign Application Priority Data
May 27, 2013    (JP) .................................. 2013-110918

(51) Int. Cl.
*B62D 21/00*    (2006.01)
*B62D 21/15*    (2006.01)
(Continued)

(52) U.S. Cl.
CPC ............. *B62D 21/152* (2013.01); *B60R 19/24* (2013.01); *B60R 19/34* (2013.01); *B62D 21/02* (2013.01);
(Continued)

(58) Field of Classification Search
CPC ....... B62D 21/152; B62D 21/02; B62D 21/03; B62D 25/082; B60R 19/24; B60R 19/34
(Continued)

(56) References Cited

U.S. PATENT DOCUMENTS

2004/0090085 A1* 5/2004 Kawasaki ................ B60K 1/04
                                                          296/187.09
2004/0200659 A1  10/2004 Miyasaka
2012/0074732 A1   3/2012 Yoshida

FOREIGN PATENT DOCUMENTS

JP    2003-226266 A    8/2003
JP    2003-335260 A    11/2003
(Continued)

OTHER PUBLICATIONS

International Search Report issued Dec. 10, 2013, in PCT/JP2013/076847 filed Oct. 2, 2013.

*Primary Examiner* — Joseph D Pape
(74) *Attorney, Agent, or Firm* — Oblon, McClelland, Maier & Neustadt, L.L.P.

(57) ABSTRACT

A vehicle-body front structure that is able to secure collision performance for a collision with a small overlap amount of a collision object with respect to a bumper frame portion is obtained. A vehicle-body front structure includes: paired frame members elongated in a vehicle front-rear direction and arranged side by side in a vehicle width direction; a bumper frame portion elongated in the vehicle width direction and provided over front ends of the paired frame members in the vehicle front-rear direction; and a load transmission member. The load transmission member is
(Continued)

placed on an inner side in the vehicle width direction relative to at least one of the frame members so as to be opposed to a load receiving portion placed between the paired frame members from at least one of a front side in the vehicle front-rear direction and an outer side in the vehicle width direction within a range where the load transmission member overlaps with the frame member in a vehicle up-down direction.

9 Claims, 7 Drawing Sheets

(51) Int. Cl.
    *B62D 25/08*     (2006.01)
    *B60R 19/34*     (2006.01)
    *B60R 19/24*     (2006.01)
    *B62D 21/02*     (2006.01)
    *B62D 21/03*     (2006.01)

(52) U.S. Cl.
    CPC ............. *B62D 21/03* (2013.01); *B62D 25/082* (2013.01); *B60R 2019/247* (2013.01)

(58) Field of Classification Search
    USPC .......................... 296/187.09, 187.1; 293/132
    See application file for complete search history.

(56) References Cited

FOREIGN PATENT DOCUMENTS

| | | |
|---|---|---|
| JP | 2007-126093 A | 5/2007 |
| JP | 2008-213739 A | 9/2008 |
| JP | 2009-035233 A | 2/2009 |
| JP | 2010-195134 A | 9/2010 |
| JP | 2012-228907 A | 11/2012 |
| WO | WO 2011/108078 A1 | 9/2011 |

\* cited by examiner

VEHICLE-BODY FRONT STRUCTURE

TECHNICAL FIELD

The present invention relates to a vehicle-body front structure.

BACKGROUND ART

There has been known a structure in which a second projecting portion provided on a back-face side of a bumper beam extension portion is caused to interfere with a first projecting portion extending outwardly in a vehicle width direction from a side-frame side face at the time of a collision of a pole with the bumper beam extension portion (see, for example, Japanese Patent Application Publication No. 2012-228907 (JP 2012-228907 A)).

SUMMARY OF THE INVENTION

Problem to be Solved by the Invention

In the meantime, in a configuration in which a projecting portion is provided in a projecting manner from an outer surface of the side-frame side face in the vehicle width direction, a design to avoid interference of the projecting portion with a front wheel or the like is required, so there is a large restriction in the design.

An object of the present invention is to obtain a vehicle-body front structure that is able to secure collision performance for a collision with a small overlap amount of a collision object with respect to a bumper frame portion.

Means for Solving the Problem

A vehicle-body front structure according to a first aspect of the present invention includes: paired frame members elongated in a vehicle front-rear direction and arranged side by side in a vehicle width direction, the paired frame members being configured such that a mounted component mounted in an engine compartment and serving as a load receiving portion is placed therebetween; a bumper frame portion elongated in the vehicle width direction and provided over front ends of the paired frame members in the vehicle front-rear direction; and a load transmission member placed on an inner side in the vehicle width direction relative to at least one of the frame members so as to be opposed to a load receiving portion placed between the paired frame members from at least one of a front side in the vehicle front-rear direction and an outer side in the vehicle width direction within a range where the load transmission member overlaps with the frame member in a vehicle up-down direction.

In the vehicle-body front structure, when a collision load is input into an end side of the bumper frame portion in the vehicle width direction, for example, the load is transmitted from the load receiving portion to the frame member or from the frame member to the load receiving portion via the load transmission member. Hereby, energy absorption due to deformation of the frame member or dispersion of the collision load via the load receiving portion is achieved.

Here, since the load transmission member is placed on an inner side, in the vehicle width direction, relative to the frame member, the load transmission member is hard to interfere with a front wheel or the like. On this account, in a configuration in which an influence of interference of the load transmission member with the front wheel or the like with respect to collision performance is restrained as such, the energy absorption or the dispersion of the collision load is achieved.

As such, in the vehicle front structure of the present aspect, it is possible to secure collision performance for a collision with a small overlap amount of a collision object with respect to the bumper frame portion. Note that examples of the load receiving portion include a power unit, a transmission, a brake, a power battery, and the like (components thereof).

In the above aspect, the load transmission member may be configured to include paired projecting portions projecting inwardly in the vehicle width direction from the paired frame members, respectively, so as to be opposed to the load receiving portion placed between the paired frame members from a front side in the vehicle front-rear direction.

In the vehicle-body front structure, when a collision load is input into an end side of the bumper frame portion in the vehicle width direction, for example, the projecting portion on a collision side abuts with the load receiving portion. As a result, along with progress of the collision, a flexural load starting from a vicinity of an abutting part between the projecting portion and the load receiving portion as a bending (breaking) start point is applied to the frame member provided with the projecting portion. Since the flexural load acts as a resisting force against rearward movement of the collision object, energy absorption along with bending (breaking) of the frame member is achieved at the time of a collision (e.g., a small overlap collision or an oblique collision) with a small overlap amount of the collision object with respect to the bumper frame portion, for example.

In the meantime, in a case of a collision with a central side of the bumper frame portion in the vehicle width direction, for example, the right and left projecting portions abut with the load receiving portion. On this account, the collision load is transmitted to a vehicle-body rear side in a dispersed manner in a large range in the vehicle width direction via right and left load receiving portions in addition to the right and left frame members.

As such, in the vehicle-body front structure according to the present aspect, it is possible to improve collision performance in a case where an overlap amount of the collision object with respect to the bumper frame portion is large and in a case where the overlap amount is small.

In the above aspect, the projecting portion may include a rear wall opposed to the load receiving portion, and an inclined wall which is inclined in the vehicle front-rear direction and which connects an outer part of the rear wall in the vehicle width direction to that inner wall of the frame member which is an inner part thereof in the vehicle width direction.

In the vehicle-body front structure, when a collision load is input into an end side of the bumper frame portion in the vehicle width direction, the rear wall of the projecting portion on a collision side abuts with the load receiving portion. As a result, a load toward a front side and an outer side in the vehicle width direction is transmitted from the load receiving portion to the frame member via the inclined wall. On this account, in comparison with a configuration in which the projecting portion does not include an inclined wall, the load from the load receiving portion efficiently acts as a flexural load to the frame member.

In the above aspect, the load transmission member may be supported by at least one of the frame member and the load receiving portion via a support member, and the load transmission member may be an inner spacer placed between the frame member and the load receiving portion in the vehicle width direction.

In the vehicle-body front structure, when a collision load is input into an end side, in the vehicle width direction, of the bumper frame portion on a side where the load transmission member is provided, for example, the inner spacer (the load transmission portion) is sandwiched between the frame member and the load receiving portion along with bending (breaking) of the frame member. Hereby, load transmission from the frame member to the load receiving portion via the inner spacer is achieved, and the collision load is partially dispersed in the load transmission passage.

In the above aspect, the inner spacer may not be restricted by the frame member.

In the vehicle-body front structure, the inner spacer is not restricted by the frame member before collision. This restrains the inner spacer from affecting deformation of the frame member in a case of a collision with a central side of the bumper frame portion in the vehicle width direction, for example.

In the above aspect, the bumper frame portion may include paired overhanging portions that overhang on both sides in the vehicle width direction relative to the frame members; and the bumper frame portion may further include an outer spacer placed between a rear face of the overhanging portion in the vehicle front-rear direction and an outer surface of the frame member in the vehicle width direction.

In the vehicle-body front structure, when a collision load is input into the overhanging portion of the bumper frame portion, the overhanging portion is bent (pushed) toward the frame member. As a result, the outer spacer placed between the overhanging portion and the frame member transmits the collision load from the overhanging portion to the frame member. Due to this load and a flexural load caused by abutment between the projecting portion and the load receiving portion, the frame member is promoted to be bent (broken) at the bending start point. When the frame member is broken so as to interfere with a structure such as a power unit, the load from the collision object is transmitted to the structure via the outer spacer and the frame member. Hereby, a lateral force that contributes to moving a vehicle to a non-collision side in the vehicle width direction is applied to the vehicle.

In the above aspect, a low strength portion having a lowered strength with respect to a flexural load may be formed in that outer portion of the frame member in the vehicle width direction which corresponds to a mounting part of the load transmission member.

In the vehicle-body front structure, when a flexural load caused by abutment between the load transmission member and the load receiving portion is applied to the frame member, bending (breaking) starting from the low strength portion as a bending start point is caused in the frame member. That is, by providing the low strength portion, the bending of the frame member is promoted (a probability of occurrence of bending increases).

In the above aspect, the load transmission member may have a higher strength than the frame member.

In the vehicle-body front structure, a load is efficiently transmitted from the load receiving portion to the frame member or from the frame member to the load receiving portion via the load transmission member. Hereby, energy absorption due to deformation of the frame member or dispersion of the collision load via the load receiving portion is achieved more effectively.

Advantageous Effects of Invention

As described above, the vehicle-body front structure according to the present invention has an excellent effect of securing collision performance for a collision with a small overlap amount of a collision object with respect to a bumper frame portion.

MODES FOR CARRYING OUT THE INVENTION

Figure 1:
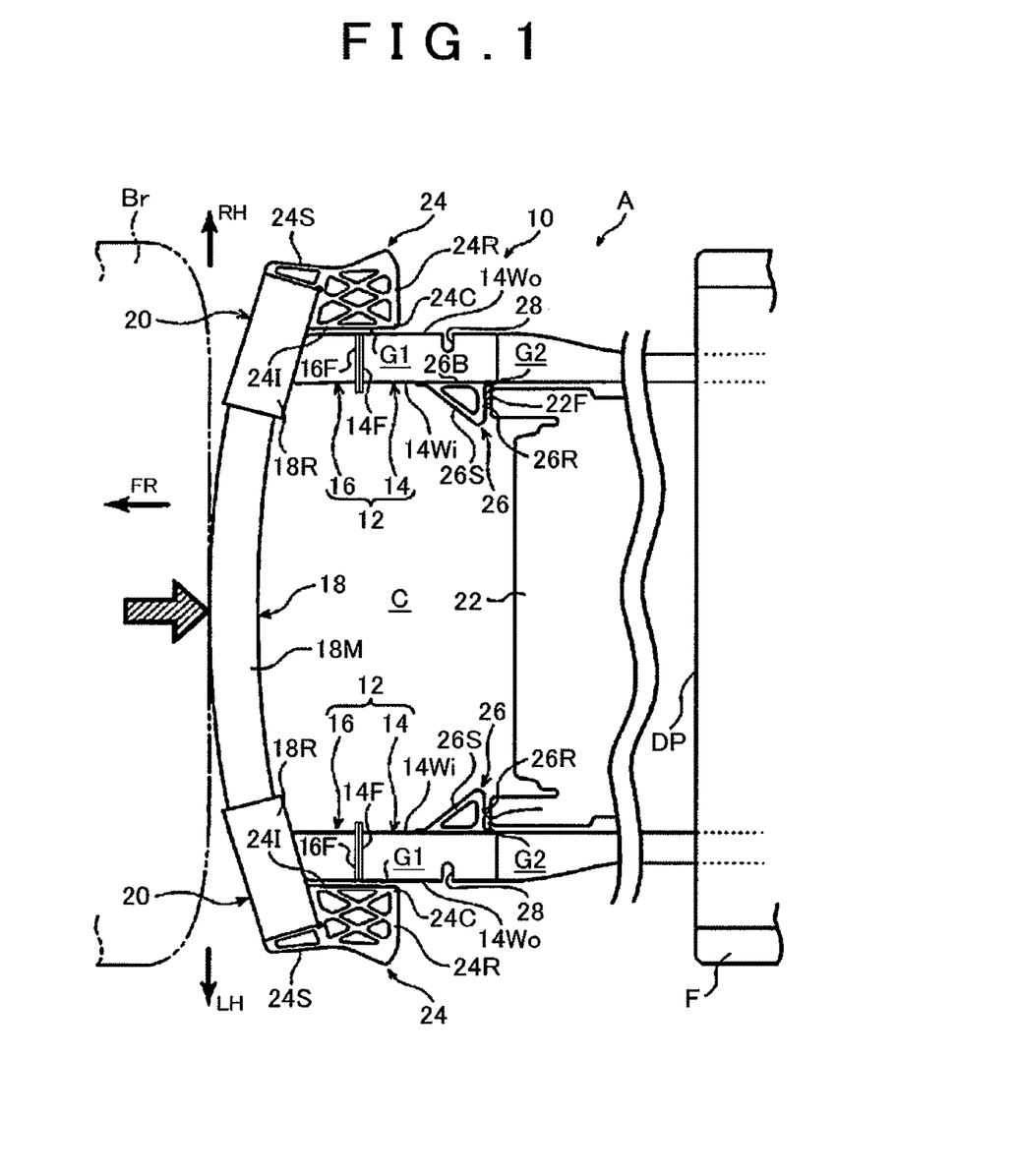
FIG. 1 is a plan view illustrating a schematic overall configuration of a vehicle-body front structure according to a first embodiment of the present invention.
Figure 2:
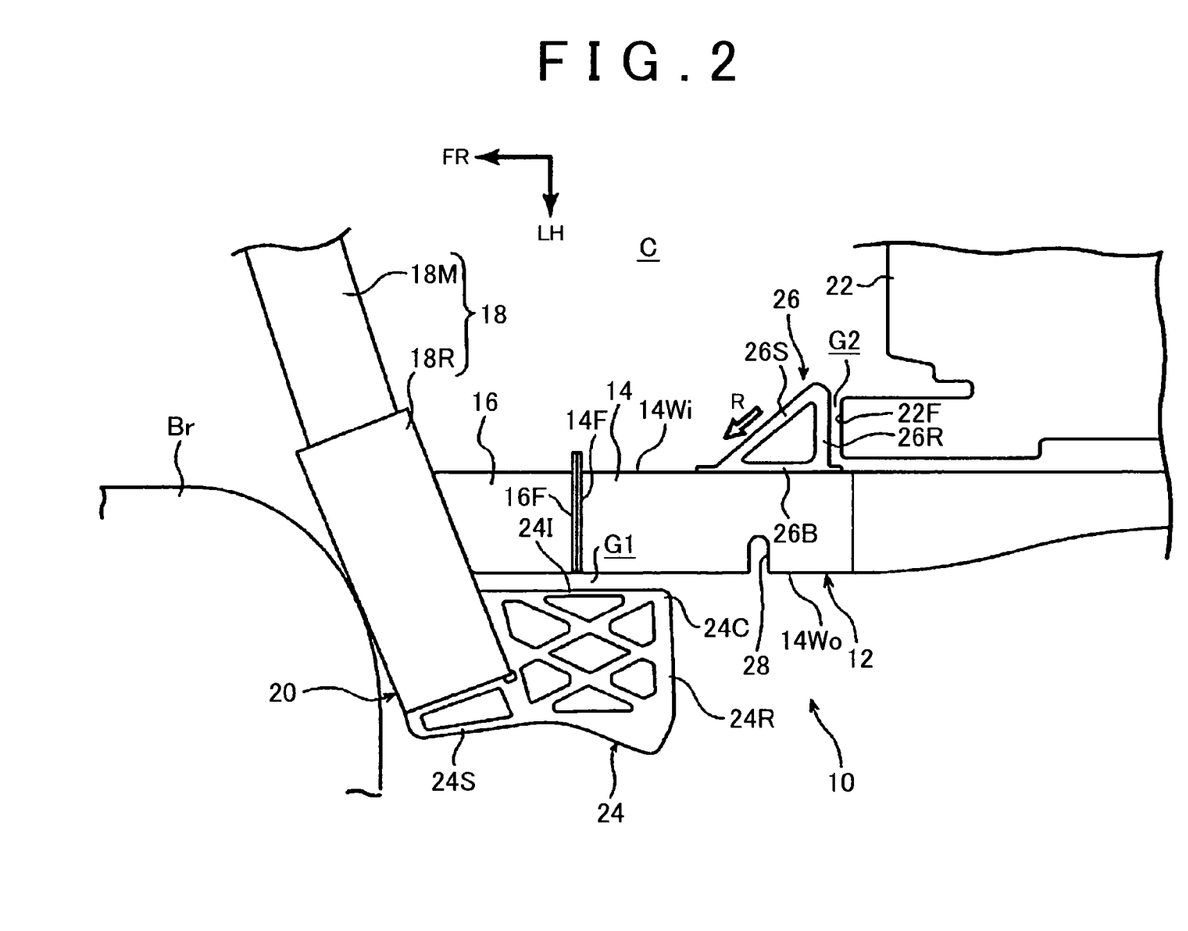
FIG. 2 is a plan view illustrating an essential part of the vehicle-body front structure according to the first embodiment of the present invention in an enlarged manner.
Figure 3:
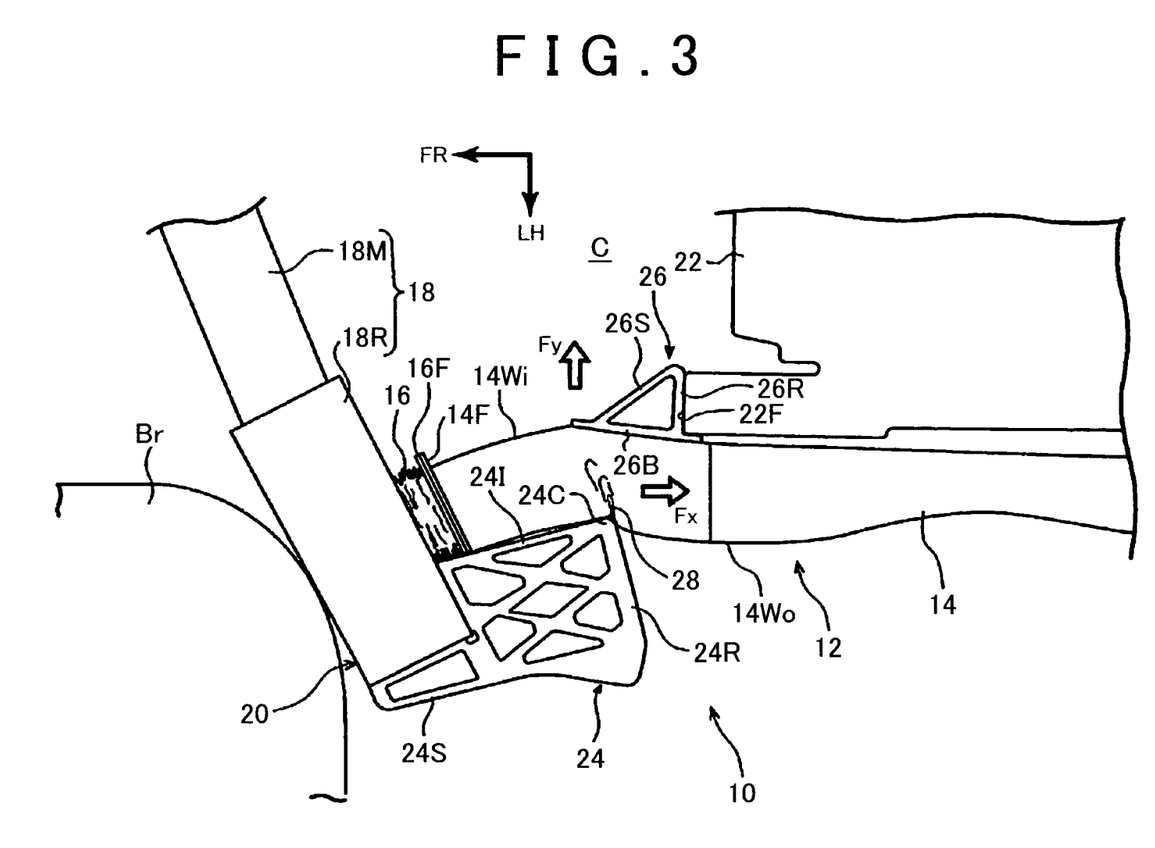
FIG. 3 is a plan view at the time of a small overlap collision and illustrates an essential part of the vehicle-body front structure according to the first embodiment of the present invention in an enlarged manner.

The following describes a vehicle-body front structure 10 according to a first embodiment of the present invention with reference to FIGS. 1 to 3. Note that an arrow FR, an arrow RH, and an arrow LH shown appropriately in each figure respectively indicate a front direction, a right direction, and a left direction of an automobile to which the vehicle-body front structure 10 is applied. Hereinafter, in a case where a description is made merely by use of directions of front/rear, up/down, and right/left, they indicate front/rear of a vehicle front-rear direction, up/down of a vehicle up-down direction, and right/left in a case of facing forward, unless otherwise specified.

Schematic Configuration of Vehicle-body Front Portion

In FIG. 1, a schematic configuration of the vehicle-body front structure 10 is illustrated in a plan view. As illustrated in this figure, the vehicle-body front structure 10 includes paired frame members 12 elongated in the front-rear direction and arranged side by side in a vehicle width direction. Each of the frame members 12 is constituted by a front side member 14, and a crash box 16 provided on a front end of the front side member 14, as major portions. A rear part of the front side member 14 reaches a lower side of a floor F of a passenger compartment via a bottom side of a dash panel DP.

Each front side member 14 has a closed sectional structure in a sectional view perpendicular to a longitudinal (front-rear) direction (not shown). Similarly, each crash box 16 has a closed sectional structure in a sectional view perpendicular to the longitudinal (front-rear) direction. Each crash box 16 is fixed to a flange 14F formed in a front end of its corresponding front side member 14 by fastening with bolts and nuts (not shown) at a flange 16F formed in a rear end of the each crash box 16.

Further, each crash box 16 is configured so as to be easily deformed compressively (broken compressively) with respect to a load in the front-rear direction, as compared with the front side member 14. Accordingly, each frame member 12 is configured such that, upon receipt of a load from the after-mentioned bumper reinforcement 18, the crash box 16 is first deformed compressively. That is, the crash box 16 in this embodiment serves as an energy absorption portion for the frame member 12.

A bumper reinforcement 18 as a bumper frame portion is provided over front ends of the right and left crash boxes 16. The bumper reinforcement 18 is a frame member elongated in the vehicle width direction, and has a closed sectional structure in a sectional view perpendicular to the longitudinal direction. Further, both ends of the bumper reinforcement 18 in its longitudinal direction serve as overhanging portions 20 overhanging outwardly in the vehicle width direction relative to respective frame members 12.

In the present embodiment, the bumper reinforcement 18 is constituted by a reinforcement main body 18M as a main body of a bumper framework, and reinforcing portions 18R that reinforce both ends of the reinforcement main body 18M with respect to bending (breaking) due to a load from a front side, as major portions.

Further, in the vehicle-body front structure 10, a power unit 22 as a load receiving portion or structure is placed between the right and left front side members 14 inside an engine compartment C. In the present embodiment, the power unit 22 is supported by (connected to) the front side members 14 via a mounting member, a suspension member, or the like (not shown). It may be considered that the power unit 22 in this embodiment includes other members (a bracket and the like) used for the support to such a vehicle body.

Spacer Member

The vehicle-body front structure 10 having a basic structure described above includes a spacer member 24 serving as an outer spacer. The spacer member 24 is placed so as to occupy a space between a rear face of the overhanging portion 20 of the bumper reinforcement 18 and an outer surface of the frame member 12 in the vehicle width direction. In the present embodiment, the spacer member 24 is provided in each of the right and left overhanging portions 20.

More specifically, the spacer member 24 is fixed to the overhanging portion 20 with a fastener such as a bolt and a nut (not shown) in a state where a front end side thereof makes contact with a rear face side of the overhanging portion 20. In the present embodiment, the spacer member 24 has an outside portion 24S covering a vehicle-width-direction outer end of the bumper reinforcement 18 (the overhanging portion 20) from outside in the vehicle width direction. At the time of the after-mentioned small overlap collision or oblique collision, a collision object (a barrier Br) directly makes contact with the outside portion 24S. Further, since the outside portion 24S is formed, the spacer member 24 secures a necessary dimension in the vehicle width direction.

Further, the spacer member 24 is configured such that, when the overhanging portion 20 is displaced inwardly in the vehicle width direction toward a rear side due to a load from the barrier Br to a vehicle rear side, the spacer member 24 abuts (interferes) with that outer wall 14Wo of the front side member 14 which faces outward in the vehicle width direction.

More specifically, the spacer member 24 is configured such that a corner portion 24C formed by a rear wall 24R facing rearward and an inner wall 24I opposed to the outer wall 14Wo via a gap 01 from inside in the vehicle width direction abuts with the outer wall 14Wo of the front side member 14. Each spacer member 24 described above functions as a load converter member that converts a rearward load input into a corresponding one of the right and left overhanging portions 20 from the barrier Br into a load including a component directed inward in the vehicle width direction, and then transmits it to a vicinity of a front end of the front side member 14.

In the following description, that inward load in the vehicle width direction which is converted by the spacer member 24 may be referred to as a "lateral force." Further, in the present embodiment, the spacer member 24 is configured to have a higher flexural strength/compression (buckling) strength than a flexural strength of the front side member 14. On this account, the spacer member 24 is configured to transmit a lateral force to the power unit 22 by deforming the front side member 14 by the lateral force without causing compression or bending of the spacer member 24 itself.

Stopped Member

Further, the vehicle-body front structure 10 includes a stopped member 26 serving as a load transmission member and a projecting portion. The stopped member 26 restricts rearward displacement of the front side member 14 toward the power unit 22. The following describes the stopped member 26 more specifically.

The stopped member 26 is fixed to that inner wall 14Wi of each of the right and left front side member 14 which faces inward in the vehicle width direction, and projects inwardly in the vehicle width direction from the front side member 14. That is, the stopped member 26 is placed in a range where the stopped member 26 overlaps with the front side member 14 in the up-down direction.

In the present embodiment, the stopped member 26 is constituted by including a base portion 26B fixed to the inner wall 14Wi, a rear wall 26R overhanging inwardly in the vehicle width direction from a rear end of the base portion 26B, and an inclined wall 26S that connects an inner end of the rear wall 26R in the vehicle width direction to a front end of the base portion 26B. That is, it can be considered that the inclined wall 26S is configured to connect the inner end of the rear wall 26R in the vehicle width direction to the inner wall 14Wi of the front side member 14 (via the base portion 26B).

The stopped member 26 is placed such that the rear wall 26R is opposed, from a front side via a gap G2, to a front surface 22F of that part of the power unit 22 which is placed on an outer end side in the vehicle width direction. Accordingly, when the front side member 14 (a mounting part of the stopped member 26 therein) is displaced rearward just by the gap G2, the stopped member 26 abuts with the front surface 22F of the power unit 22. Due to this abutment, further rearward displacement of the front side member 14 is restricted. In order to achieve this displacement restriction function, the stopped member 26 is configured to have a higher flexural strength/compression (buckling) strength than a flexural strength of the front side member 14.

The stopped member 26 described above is formed in a frame shape of a right angled triangle (a wedge shape) in which an angle formed by the base portion 26B and the rear wall 26R is a right angle, in a plan view. The stopped member 26 is fixed to the inner wall 14Wi of the front side member 14 at its base portion 26B with a bolt and a nut (not shown), for example.

Low Strength Portion

Further, the front side member 14 constituting the vehicle-body front structure 10 is provided with a low strength portion (a weak portion) 28 configured such that a strength with respect to a flexural load in the vehicle width direction is lower than the other portions of the front side member 14. The low strength portion 28 in the present embodiment is formed as a recessed portion (a cutout portion) that is opened outwardly in the vehicle width direction, on the outer wall 14Wo of the front side member 14. The low strength portion 28 is formed on each of the outer walls 14Wo of the right and left front side members 14.

Note that the low strength portion 28 may be formed such that a wall thickness of a specific part of the outer wall 14Wo is made thinner than wall thicknesses of the other parts thereof, or reinforcement is omitted only in a specific part, for example. Further, in the front side member 14 provided with the low strength portion 28, an offset yield stress required for load transmission (support) at the time of a full overlap collision is secured with respect to axial compression.

In terms of the front-rear direction, the low strength portion 28 is placed in that outer part (a vicinity of a mounting range of the stopped member 26) in the vehicle width direction which corresponds to the mounting part of the stopped member 26. In the present embodiment, a position of the low strength portion 28 in the front-rear direction is set in the vicinity of the rear wall 26R. Further, the position of the low strength portion 28 in the front-rear direction would be placed generally at the same position as a position, in the front-rear direction, of the corner portion 24C of the spacer member 24 in a case where the crash box 16 is crushed completely.

Interaction of First Embodiment

Next will be described an interaction of the first embodiment.

Small Overlap Collision or Oblique Collision

First described is an interaction in a case where such a collision occurs that a collision object collides with mainly a left side, which is one side, in the vehicle width direction, of an automobile A to which the vehicle-body front structure 10 is applied. Such a type of collision can include a small overlap collision and an oblique collision.

Here, the small overlap collision is defined as a collision in which an overlap amount, in the vehicle width direction, with respect to a collision counterpart prescribed in IIHS, for example, is 25% or less, among front end collisions of the automobile A. For example, a collision with an outer side, in the vehicle width direction, of the front side member as a vehicle body framework corresponds to the small overlap collision. The present embodiment assumes a small overlap collision at a relative velocity of 64 km/hr as an example. Further, the oblique collision is defined, for example, as a collision with an obliquely front side prescribed in NHTSA (as an example, a collision at a relative angle of 15° relative to a collision counterpart and with an overlap amount of about 35% in the vehicle width direction). The present embodiment assumes an oblique collision at a relative velocity of 90 km/hr as an example.

When such a type of collision occurs, a rearward load is input into a vehicle-width-direction end of the bumper reinforcement 18 from the collision object (the barrier Br in FIG. 2) (FIG. 2 illustrates an example of the small overlap collision). Consequently, the crash box 16 is compressively broken, so that energy absorption at the beginning of collision is achieved. Since the reinforcing portion 18R is provided, deformation of the overhanging portion 20 of the bumper reinforcement 18 is restrained in the course of energy absorption by the crash box 16.

When the crash box 16 is compressively broken (smashed), the front side member 14 is deformed, so that the stopped member 26 fixed to the front side member 14 abuts with the front surface 22F of the power unit 22, as illustrated in FIG. 3. As a result, the barrier Br moves further rearward while making contact with the overhanging portion 20, and along with this, a flexural load is applied to the front side member 14. That is, the front side member 14 receives a load that restricts rearward movement via the stopped member 26 (the stopped member 26 functions as a load transmission member), and a position of the load from the barrier Br is converted into a bending moment starting from the mounting part of the stopped member 26. Due to this flexural load, the bending moment around an abutting part between the stopped member 26 and the front surface 22F of the power unit 22 is applied to the front side member 14. This bending moment contributes to bending (breaking) of the front side member 14.

Particularly, a reaction force from the power unit 22 is transmitted to the front side member 14 along the inclined wall 26S of the stopped member 26 (see an arrow R in FIG. 2). Even in this state, the stopped member 26 functions as a load transmission member. Among the reaction force along the inclined wall 26S, a component along the vehicle width direction efficiently causes the bending moment around the abutting part. That is, in a comparative example (included in the present invention) in which a stopped member that is rectangular in a plan view without an inclined wall is provided, a reaction force from the power unit 22 acts mainly in the front-rear direction, which makes it hard to cause a bending moment to the front side member 14. In comparison with the comparative example, since the stopped member 26 causes a bending moment efficiently by the inclined wall 26S as described above, the stopped member 26 highly contributes to bending (breaking) of the front side member 14.

Besides, the low strength portion 28 is formed on the outer wall 14Wo of the front side member 14, so the bending (breaking) of the front side member 14 starting from the low strength portion 28 is promoted. That is, it is possible to cause the bending (breaking) of the front side member 14 with high probability (robustness is improved).

As described above, in the middle of collision, energy absorption by the breaking of the front side member 14 can be achieved.

Moreover, when the overhanging portion 20 is deformed due to a load from the barrier Br and the corner portion 24c of the spacer member 24 abuts and interferes with the outer wall 14Wo of the front side member 14, the breaking of the front side member 14 is further promoted while the front side member 14 receives a lateral force from the spacer member 24. Further, the front side member 14 thus broken inwardly in the vehicle width direction interferes with the power unit 22 from outside in the vehicle width direction.

Hereby, a load transmission passage to the power unit 22 via the barrier Br, the spacer member 24, and the front side member 14 is formed. The collision load input into the overhanging portion 20 as such is transmitted to a vehicle rear side and a non-collision side in the vehicle width direction via the power unit 22 and its support structure or the like (the collision load is transmitted to each part of a vehicle body as a load Fx in the front-rear direction and a load Fy (lateral force) in the vehicle width direction as illustrated in FIG. 3). This makes it possible to prevent or effectively restrain a local large deformation of a collision-side end portion of the vehicle body due to a small overlap collision.

Besides, when the automobile A itself is moved toward the non-collision side due to a lateral force (an inertial force), which is a load of an inward component in the vehicle width direction and input into the power unit 22 serving as a mass concentration portion in the automobile A, the input of the collision load into the overhanging portion 20 is cancelled or relaxed (passing-each-other is promoted). This also prevents or effectively restrains a local large deformation of the collision-side end portion of the vehicle body.

Moreover, the stopped member 26 is placed on an inner side in the vehicle width direction relative to the frame member 12 (the front side member 14). Accordingly, even if the stopped member 26 moves rearward at the time of the aforementioned small overlap collision or oblique collision, the stopped member 26 is hard to interfere with a front wheel and the like (a front wheel and a wheel house). In a configuration in which an influence of interference of the stopped member 26 with the front wheel with respect to collision performance is restrained as such, energy absorption along with the deformation of the front side member 14 is achieved.

As such, in the vehicle-body front structure 10 according to the first embodiment, it is possible to secure or improve the collision performance with respect to a small overlap collision or an oblique collision.

Full Overlap Front End Collision

Next will be described an interaction at the time of a full overlap front end collision. In a case of a full overlap front end collision, the barrier Br collides with a central part of the bumper reinforcement 18 in the vehicle width direction, as illustrated in FIG. 1. As a result, a rearward load is transmitted to the right and left crash boxes 16 via the bumper reinforcement 18, so that the right and left crash boxes 16 are compressively broken and energy absorption at the beginning of collision is achieved.

When the right and left crash boxes 16 are compressively broken (smashed), the front side members 14 are deformed, so that the right and left stopped members 26 fixed to the front side members 14 abut with the front surface 22F of the power unit 22. Hereby, a rearward load from the barrier Br is input into the power unit 22 via the right and left stopped members 26, so that the power unit 22 is pushed rearward. That is, the stopped members 26 function as a load transmission member.

When the power unit 22 abuts and interferes with a dash panel DP, a collision load is transmitted to a floor, a floor tunnel portion, a floor member (a rear part of the front side member), and the like via the dash panel DP. Further, when the load is input into the dash panel DP extending in the vehicle width direction, the collision load is also transmitted dispersedly to right and left rockers, front pillars (side doors), and the like.

Hereby, in the automobile A to which the vehicle-body front structure 10 is applied, it is possible to effectively restrain deformation of a cabin due to a full overlap front end collision. In other words, in comparison with a configuration to which the vehicle-body front structure 10 (particularly, the right and left stopped members 26) is not applied, it is possible to secure equivalent collision performance with respect to the full overlap front end collision and to reduce a required strength to each part of the vehicle body, which contributes to lightweighting of the vehicle body (low fuel efficiency).

SUMMARY

As described above, in the vehicle-body front structure 10, in a case where an overlap amount of the barrier Br with respect to the bumper reinforcement 18 is large (in a case of a full overlap front end collision) and in a case where the overlap amount is small (in a case of a small overlap collision or an oblique collision], it is possible to improve collision performance. Further, the stopped member 26 having a frame shape of a right angled triangle in a plan view has good mountability in a limited space in the engine compartment C, in comparison with the stopped member in the comparative example in which the stopped member has a rectangular shape in a plan view.

Modification of First Embodiment

Figure 4:
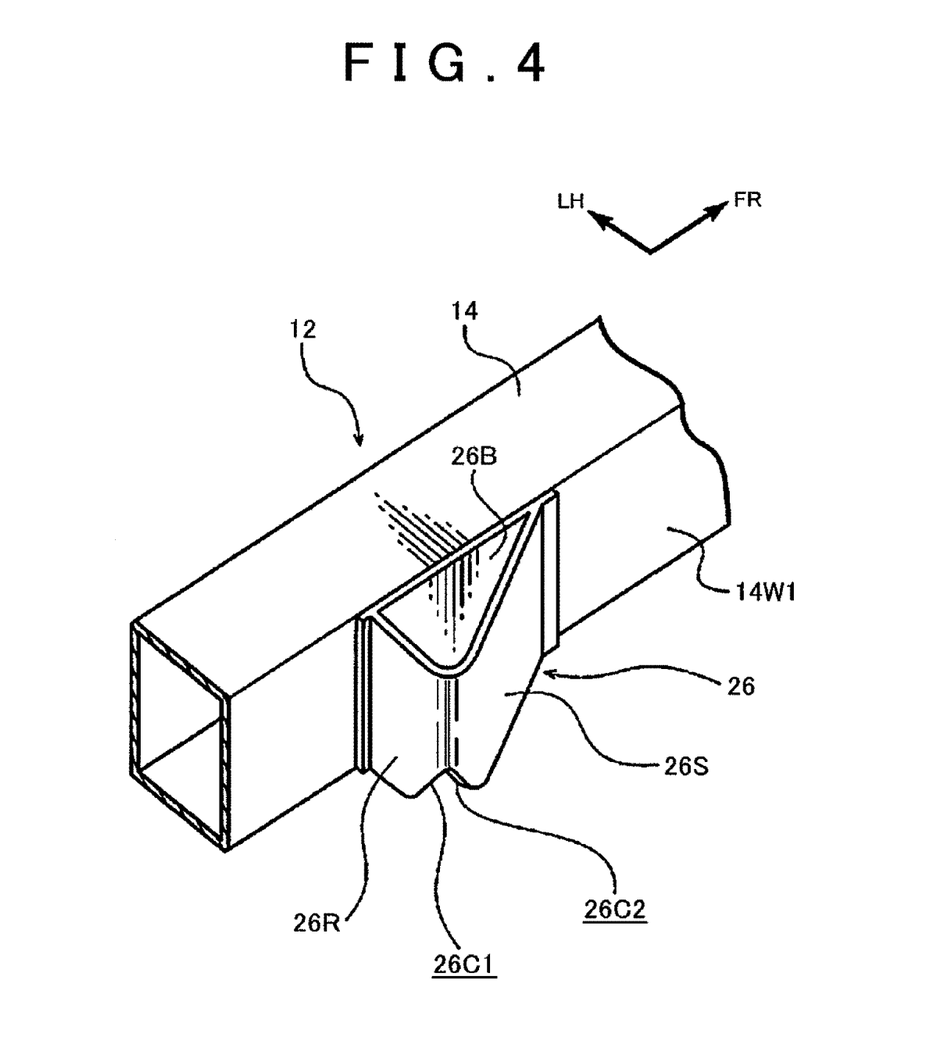
FIG. 4 is a perspective view illustrating a modification of a stopped portion constituting the vehicle-body front structure according to the first embodiment of the present invention.

Note that the first embodiment deals with an example in which the stopped member 26 has a uniform sectional shape in the up-down direction, but the present invention is not limited to this. For example, a shape of the stopped member 26 may be changed appropriately in order to avoid interference with mounted components in the engine compartment C. More specifically, as illustrated in FIG. 4, a notch portion 26C1 may be formed in that part of the rear wall 26R which is an inner end in the vehicle width direction and a bottom end. In this example, a notch portion 26C2 is also formed in that part of the inclined wall 26S which is a rear end and a bottom end, so as to avoid interference with mounted components (not shown). The notch portion of the stopped member 26 can be set appropriately according to a dimensional shape and a placement of the mounted components.

Further, the first embodiment deals with an example in which the vehicle-body front structure 10 is configured symmetrically with respect to a center line in the vehicle width direction, but the present invention is not limited to this. For example, the right and left stopped member 26 may be configured to have different positions in the front-rear direction and different projection amounts from the inner walls 14Wi toward inside in the vehicle width direction according to a placement and a shape of the load receiving portion.

Second Embodiment

Figure 5:
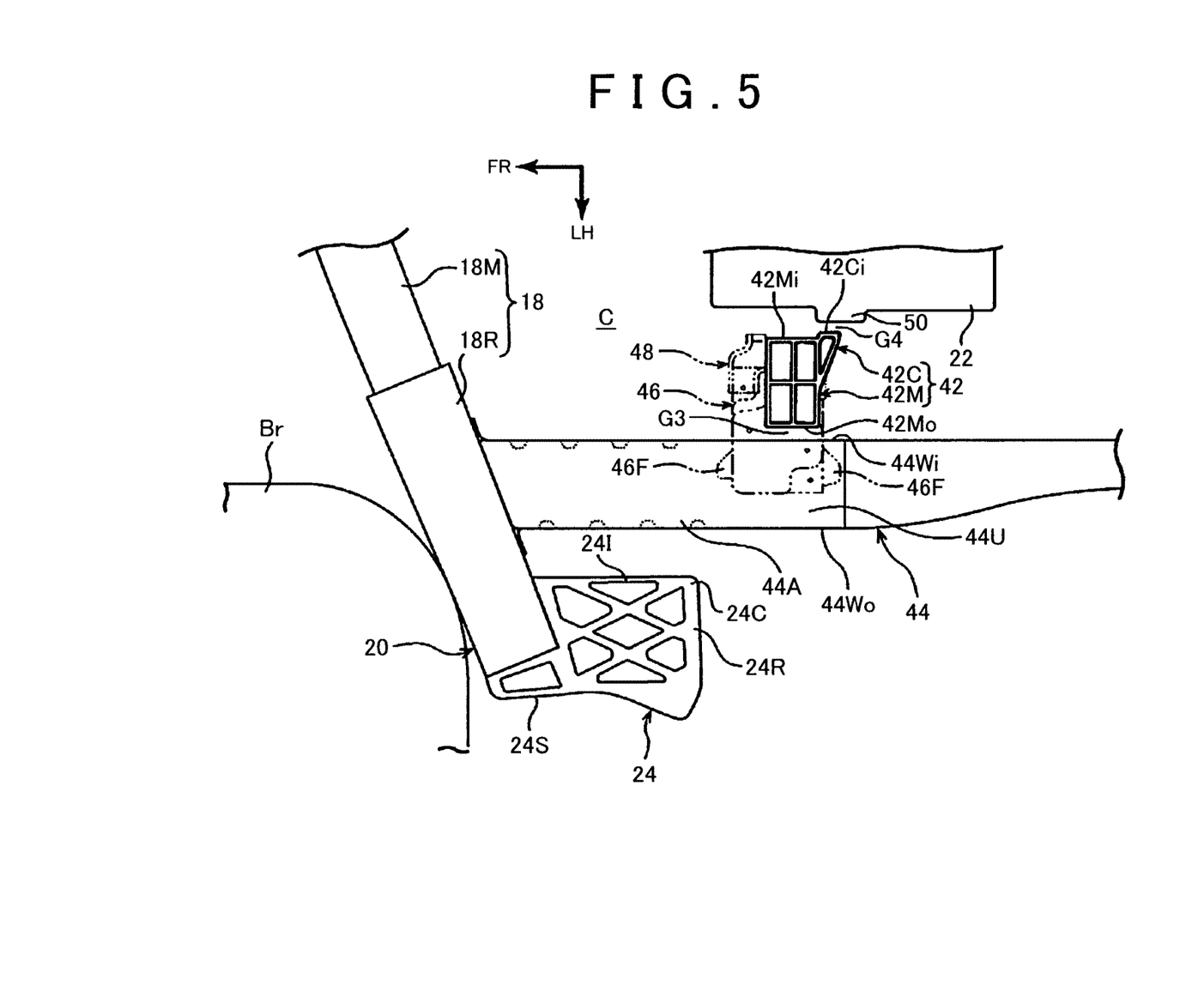
FIG. 5 is a plan view illustrating an essential part of a vehicle-body front structure according to a second embodiment of the present invention in an enlarged manner.
Figure 6:
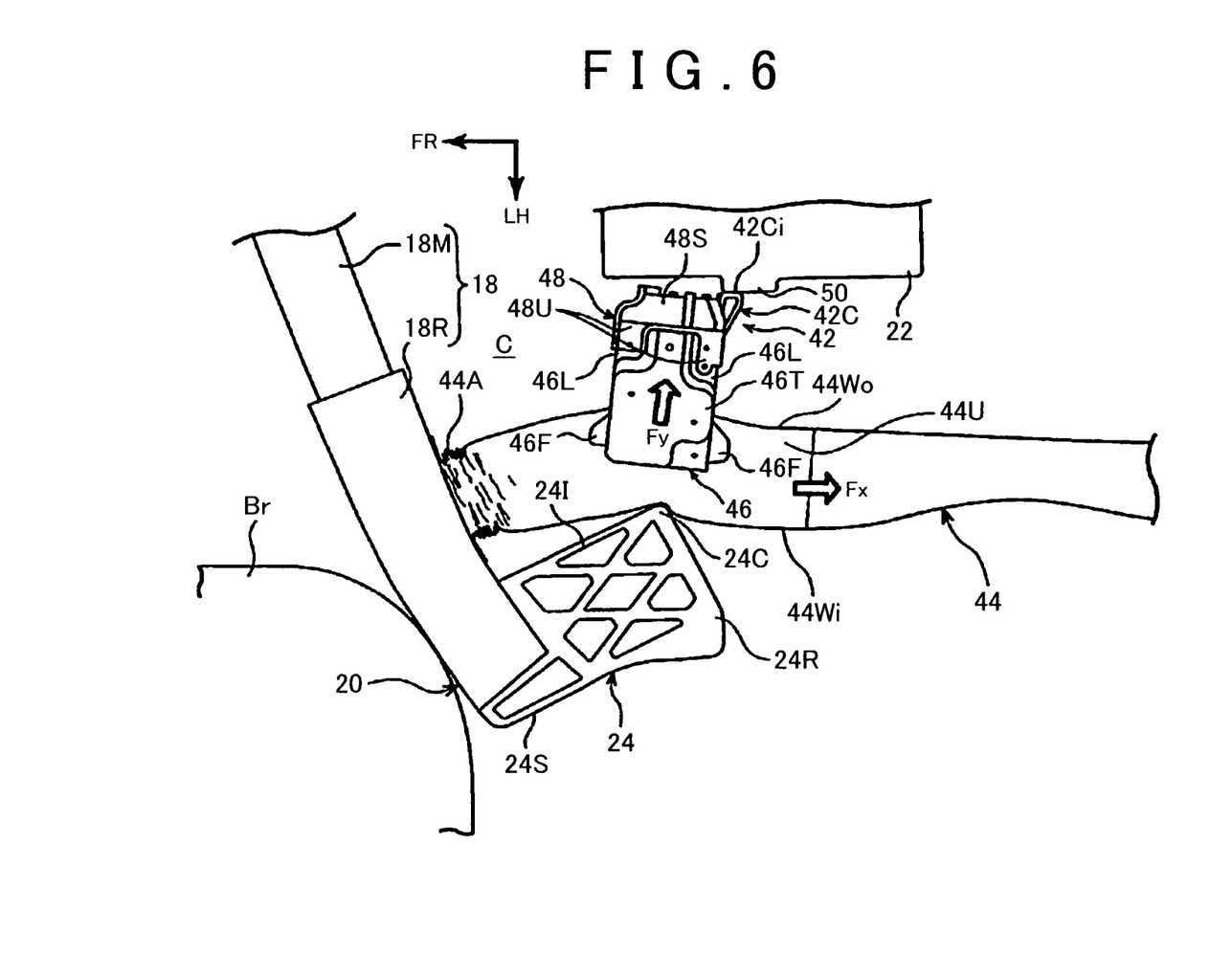
FIG. 6 is a plan view at the time of a small overlap collision and illustrates an essential part of the vehicle-body front structure according to the second embodiment of the present invention in an enlarged manner.
Figure 7A:
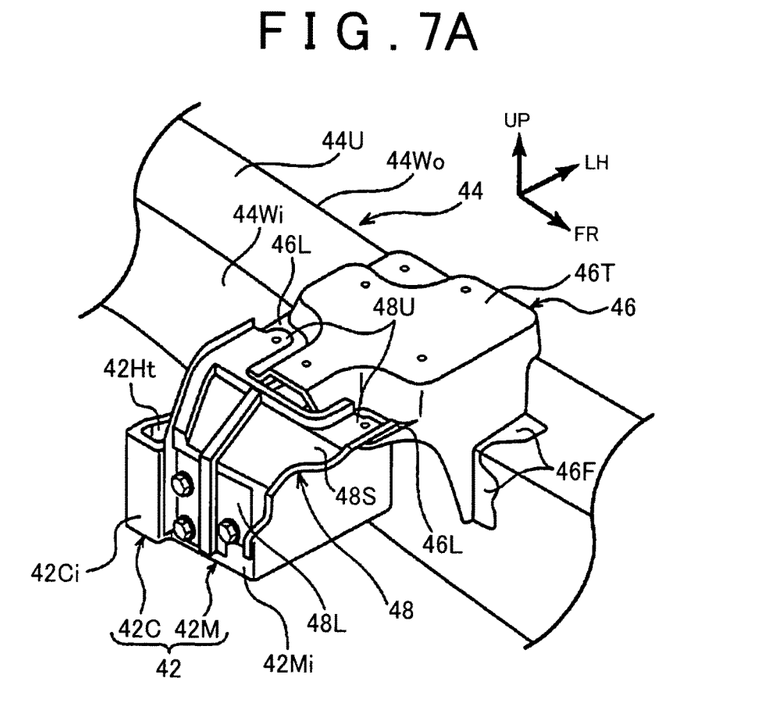
FIG. 7A is a perspective view of an assembled state to a vehicle body and illustrates an inner spacer constituting the vehicle-body front structure according to the second embodiment of the present invention.
Figure 7B:
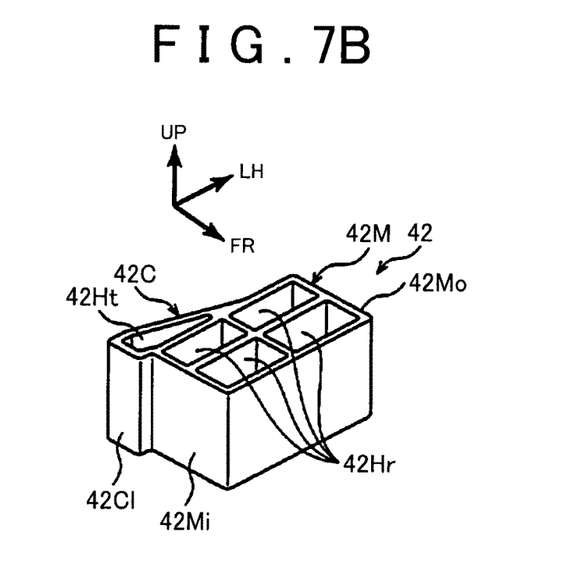
FIG. 7B is a perspective view illustrating, as a single body, the inner spacer constituting the vehicle-body front structure according to the second embodiment of the present invention.

The following describes a vehicle-body front structure 40 according to a second embodiment with reference to FIGS. 5 to 7. Note that a constituent basically similar to a constituent of the first embodiment has the same reference numeral as the constituent of the first embodiment, and its description and illustration may be omitted.

In FIG. 5, an essential part of the vehicle-body front structure 40 is illustrated in a plan view. Further, in FIG. 7A, the essential part of the vehicle-body front structure 40 is illustrated in a perspective view. As illustrated in these figures, the vehicle-body front structure 40 is different from the first embodiment in that an inner spacer 42 is provided as a load transmission member instead of the stopped member 26. Further, in the present embodiment, the vehicle-body front structure 40 is configured to include a front side member 44 as a frame member, instead of the frame member 12.

The front side member 44 is configured such that its front part serves as an energy absorption portion 44A, and does not include an independent crash box. On this account, the vehicle-body front structure 40 does not include parts that overhang toward an outer side in the vehicle width direction and correspond to the flanges 14F, 16F of the frame member 12. Further, in the vehicle-body front structure 40, a bumper reinforcement 18 is provided over front ends of right and left energy absorption portions (hereinafter each referred to as the "EA portions") 44A.

An inner spacer 42 is indirectly supported to a rear part (a front end or its vicinity of a part except the EA portion 44A) of the front side member 44 relative to the EA portion 44A. More specifically, the inner spacer 42 is supported by the front side member 14 via a battery carrier 46 and a bracket 48. Note that, in FIG. 5, in order to show a placement of the inner spacer 42 (a relationship with the front side member 44 and a power unit 22), the battery carrier 46 and the bracket 48 are illustrated by an imaginary line.

As illustrated in FIG. 5, the battery carrier 46 is fixed to that rear part of the front side member 44 which corresponds to the EA portion 44A. The battery carrier 46 is fixed to an upper wall 44U of the front side member 44 and an inner wall 44Wi there facing inward in the vehicle width direction, at flanges 46F formed at both front and rear ends of the battery carrier 46. A battery (not shown) is supported to a top plate 46T of the battery carrier 46. Note that, in the present embodiment, the power unit 22 is configured to include an engine as an internal combustion engine, and a power of the battery is also used for driving of a starter motor 50 (described later) for engine start.

As illustrated in FIG. 7A, the top plate 46T of the battery carrier 46 is placed on an upper side relative to the upper wall 44U of the front side member 44, and its inner end in the vehicle width direction overhangs inwardly (toward a power-unit-22 side) in the vehicle width direction relative to the inner wall 44Wi of the front side member 44. In both front and rear ends of an inner end part of the top plate 46T in the vehicle width direction, lower portions 46L that are one-step lower than the other parts are formed. The other end side of the bracket 48 one end side of which is fixed to the inner spacer 42 is fixed to the lower portions 46L.

The bracket 48 is configured such that an upper flange 48U along a horizontal plane is connected to a lower flange 48L along a vertical plane facing the vehicle width direction, via an inclined wall 48S inclined relative to the horizontal plane and the vertical plane. The upper flange 48U is divided into front and rear parts so as to extend over the lower portions 46L of the top plate 46T of the battery carrier 46 and to be fixed to the lower portions 46L by fastening or the like. Hereby, the bracket 48 is configured so as not to interfere with the battery supported by the battery carrier 46.

In the meantime, the lower flange 48L is fixed to the inner end part of the inner spacer 42 in the vehicle width direction, so as to hold the inner spacer 42. Accordingly, in the present embodiment, the battery carrier 46 and the bracket 48 correspond to a support member that supports the inner spacer 42 with respect to the front side member 44.

Here, the following supplements the inner spacer 42. As illustrated in FIG. 7B, the inner spacer 42 is constituted by a body portion 42M having a rectangular outer shape in a plan view, and a contact portion 42C continuing to a rear side of the body portion 42M and having an outer shape of a generally right angled triangle (a wedge shape) in a plan view, as major portions. More specifically, the body portion 42M is configured such that four holes 42Hr penetrating in the up-down direction and having a rectangular shape in a plan view are arranged in the front-rear direction and the right-left direction, so that four rectangular frames are gathered. The contact portion 42C is configured such that a hole 42Ht penetrating in the up-down direction and having a right-angled triangular shape in a plane view is formed, so as to form a right-angled triangular frame shape in which a corner on a front side and an inner end in the vehicle width direction is a right angle. An inner wall 42Ci that forms an inner end of the contact portion 42C in the vehicle width direction projects inwardly in the vehicle width direction relative to an inner wall 42Mi that forms an inner end of the body portion 42M in the vehicle width direction.

As illustrated in FIG. 7A, the inner spacer 42 is fixed to the bracket 48 at the body portion 42M. More specifically, in a state where the inner wall 42Mi of the body portion 42M is superimposed on the lower flange 48L of the bracket 48 from outside in the vehicle width direction, the inner wall 42Mi is fixed to the lower flange 48L by fastening or the like. In this state, the body portion 42M is placed below the top plate 46T of the battery carrier 46, and the upper flange 48U and the inclined wall 48S of the bracket 48.

Further, in this state, as illustrated in FIG. 5, an outer wall 42Mo forming an outer end of the body portion 42M in the vehicle width direction is opposed, from inside in the vehicle width direction via a gap G3, to that inner wall 44Wi of the front side member 44 (a rear part of the EA portion 44A therein) which faces inward in the vehicle width direction. That is, the inner spacer 42 supported by the front side member 44 via the battery carrier 46 and the bracket 48 is contactless and non-restrictive with respect to the front side member 44.

Further, in the present embodiment, the inner spacer 42 is placed between the front side member 44 and the power unit 22 in a range overlapping with the front side member 44 in the up-down direction.

More specifically, the inner spacer 42 placed on an inner side in the vehicle width direction relative to the front side member 44 is configured such that its inner wall 42Ci of the contact portion 42C is opposed, from outside in the vehicle width direction via a gap G4, to that projecting portion of the power unit 22 which projects outwardly in the vehicle width direction. In the present embodiment, the projecting portion of the power unit 22 is an outer end part of the starter motor 50 (or a housing thereof) in the vehicle width direction. That is, a rearward projection amount of the contact portion 42C from the body portion 42M, and a projection amount of the inner wall 42Ci from the inner wall 42Mi toward the inside in the vehicle width direction are set so that the contact portion 42C is opposed to a front end side of the starter motor 50 via the gap G4.

The inner spacer 42 described above is configured to have a higher flexural strength/compression (buckling) strength than a flexural strength of the front side member 44. Meanwhile, a strength of the battery carrier 46 fixed to the front side member 44 is set to be sufficiently smaller than the flexural strength/compression (buckling) strength of the front side member 44. This allows the vehicle-body front structure 40 to have a configuration in which an influence of the battery carrier 46 to a deformation mode of the front side member 44 at the time of a collision falls within an allowable range (can be ignored).

Further, in the present embodiment, the inner spacer 42 (and the battery carrier 46, the bracket 48) is provided only on one side in the vehicle width direction. In the present embodiment, the inner spacer 42 is provided on a left side in a case of facing the vehicle front side. Note that the automobile A to which the vehicle-body front structure 40 is applied is assumed a left-hand drive car in which a driver seat is placed on the left side. Further, in the vehicle-body front structure 40, the low strength portion 28 is not formed in the front side member 44. The other structure of the vehicle-body front structure 40 is similar to the vehicle-body front structure 10 including those parts which are not illustrated herein.

Interaction of Second Embodiment

Next will be described an interaction of the second embodiment, mainly about points different from the interaction of the first embodiment.

Small Overlap Collision or Oblique Collision

First described is an interaction in a case where a small overlap collision or an oblique collision occurs mainly on a left side, which is one side, in the vehicle width direction, of the automobile A to which the vehicle-body front structure 40 is applied. When such a type of collision occurs, the EA portion 44A is compressively broken due to a rearward load input into a vehicle-width-direction end of the bumper reinforcement 18 from a barrier Br, so that energy absorption at the beginning of collision is achieved, as illustrated in FIG. 6.

When the EA portion 44A is compressively broken, an overhanging portion 20 is deformed due to the load from the barrier Br, so that a corner portion 24c of a spacer member 24 abuts with an outer wall 44Wo of the front side member 44. As a result, the front side member 44 is bent (broken) starting from an abutting part with the corner portion 24C of the spacer member 24, so as to project inwardly in the vehicle width direction in a plan view.

Along with the bending of the front side member 44, the inner wall 44Wi of the front side member 44 abuts with the outer wall 42Mo of the inner spacer 42, and the inner wall 42Ci of the inner spacer 42 abuts with the starter motor 50. Hereby, a lateral force from the spacer member 24 is transmitted to the starter motor 50, namely, the power unit 22 via the front side member 44 and the inner spacer 42.

Hereby, a load transmission passage to the power unit 22 via the barrier Br, the spacer member 24, the front side member 44, and the inner spacer 42 is formed. That is, the inner spacer 42 functions as a load transmission member. A collision load input into the overhanging portion 20 as described above is transmitted to a vehicle rear side and a non-collision side in the vehicle width direction via the power unit 22 and its support structure or the like (the collision load is transmitted to each part of a vehicle body as a load Fx in the front-rear direction and a load Fy (lateral force) in the vehicle width direction as illustrated in FIG. 6). This makes it possible to prevent or effectively restrain a local large deformation of a collision-side end portion of the vehicle body due to a small overlap collision.

Besides, when the automobile A itself is moved toward the non-collision side due to a lateral force (an inertial force), which is a load of an inward component in the vehicle width direction and input into the power unit 22 serving as a mass concentration portion in the automobile A, the input of the collision load into the overhanging portion 20 is cancelled or relaxed (passing-each-other is promoted). This also prevents or effectively restrains a local large deformation of a collision-side end portion of the vehicle body.

Moreover, the stopped member 26 is placed on an inner side, in the vehicle width direction, relative to the frame member 12 (the front side member 44). Accordingly, even if the stopped member 26 moves rearward at the time of the aforementioned small overlap collision or oblique collision, the stopped member 26 is hard to interfere with a front wheel and the like. Hereby, in the vehicle-body front structure 40, an influence of interference of the stopped member 26 with the front wheel with respect to collision performance is restrained, and energy absorption along with the deformation of the front side member 44 is achieved.

As such, in the vehicle-body front structure 40 according to the second embodiment, it is possible to secure or improve the collision performance with respect to a small overlap collision or an oblique collision.

Full Overlap Front End Collision

Next will be described an interaction at the time of a full overlap front end collision. In a case of a full overlap front end collision, a barrier Br collides with a central part of the bumper reinforcement 18 in the vehicle width direction (not shown). As a result, a rearward load is transmitted into the right and left EA portions 44A via the bumper reinforcement 18, so that the right and left EA portions 44A are compressively broken and energy absorption at the beginning of collision is achieved.

When the right and left EA portions 44A are compressively broken as such, parts behind the EA portions 44A in the front side member 44 are deformed.

Here, the inner spacer 42 is not directly fixed to the front side member 44, but is supported by the front side member 44 via the battery carrier 46 and the bracket 48. On this account, an influence that the inner spacer 42, which is a high-strength member as compared with the front side member 44, gives to deformation of the front side member 44 is small (within an allowable range). Particularly, in a configuration in which the inner spacer 42 is provided only on one side in the vehicle width direction, that difference between deformation properties of the right and left front side members 44 which occurs by providing the inner spacer 42 is restrained to be small (within an allowable range).

Hereby, in the vehicle-body front structure 40, the front side member 44 is deformed in a necessary form at the time of a full overlap front end collision, collision performance as designed can be obtained.

Summary

As described above, in the vehicle-body front structure 40, while an influence to collision performance in a case where an overlap amount of the barrier Br to the bumper reinforcement 18 is large is restrained, collision performance in a case where the overlap amount is small can be improved.

Modification of Second Embodiment

Note that the second embodiment deals with an example in which the inner spacer 42 is provided only on one side (on a driver side) in the vehicle width direction, but the present invention is not limited to this. For example, the inner spacer 42 may be provided only on a passenger side, or the inner spacer 42 may be provided on both sides in the vehicle width direction.

Further, the second embodiment deals with an example in which the inner spacer 42 is supported by use of the battery carrier 46, but the present invention is not limited to this. For example, the inner spacer may be supported to the front side member 44 only by using an exclusive bracket, or the inner spacer 42 may be supported by use of other mounted components in the engine compartment C. Further, the inner spacer 42 is not limited to such a configuration in which the inner spacer 42 is supported on a front-side-member-44 side, and may be supported on a power-unit-22 side.

Further, the second embodiment deals with an example in which the inner spacer 42 is not restricted by the front side member 44, but the present invention is not limited to this. For example, the inner spacer 42 may be configured to be fixed to the inner wall 44Wi of the front side member 44. In this case, a fixed (a restricted) part of the inner spacer 42 to the inner wall 44Wi is set to one or more parts at the same position in the front-rear direction, thereby making it possible to restrain an influence to deformation properties of the front side member 44 to be small in comparison with a case where the inner spacer 42 is fixed at a plurality of parts distanced from each other in the front-rear direction.

Further, the second embodiment deals with an example in which the low strength portion 28 is not formed in the front side member 44, but the present invention is not limited to this. For example, the strength portion 28 may be formed in that part of the front side member 44 which is placed behind the EA portion 44A and near the corner portion 24C of the spacer member 24 (in front of the inner spacer 42 or within a mounting range thereof).

Modification of Each Embodiment

Further, each of the above embodiments deals with an example in which the spacer member 24 is provided in the overhanging portion 20 of the bumper reinforcement 18, but the present invention is not limited to this. For example, the spacer member may not be provided in the overhanging portion 20. Further, it goes without saying that a dimensional shape of the spacer member 24 is not limited to the example in the above embodiments, and may have various dimensional shapes according to needs.

Further, each of the above embodiments deals with an example in which a load receiving portion is the power unit 22 (the starter motor 50 thereof), but the present invention is not limited to this. For example, as the load receiving portion, a mounted component in the engine compartment C, such as an actuator of an antilock brake system (ABS), a housing of a transmission, or a battery outer case, can be employed.

Furthermore, the first embodiment deals with an example in which the frame member 12 includes the crash box 16, and the second embodiment deals with an example in which the front side member 44 includes the EA portion 44A. However, the present invention is not limited to this. For example, the front side member 44 may be employed in the first embodiment, and the frame member 12 may be employed in the second embodiment.

Further, each of the above embodiments deals with an example in which the bumper reinforcement 18 includes the reinforcing portion 18R, but the present invention is not limited to this. For example, the bumper reinforcement 18 (the overhanging portion 20 thereof) may be configured so as not include the reinforcing portion 18R.

In addition, it goes without saying that the present invention can be performed with various modifications without departing from the gist of the present invention.

The invention claimed is:

1. A vehicle-body front structure comprising:
   paired frame members elongated in a vehicle front-rear direction and arranged side by side in a vehicle width direction, the paired frame members being configured such that a load receiving portion mounted in an engine compartment is placed between the paired frame members;
   a bumper frame portion elongated in the vehicle width direction and provided over front ends of the paired frame members in the vehicle front-rear direction; and
   a load transmission member placed on an inner side in the vehicle width direction relative to at least one of the frame members so as to be opposed to the load receiving portion from at least one of a front side of the load receiving portion in the vehicle front-rear direction and an outer side of the load receiving portion in the vehicle width direction, the load transmission member opposing the load receiving portion within a range in a vehicle up-down direction where the load transmission member overlaps with the frame member, wherein
   the load transmission member is supported by at least one of the at least one of the frame members and the load receiving portion via a support member; and
   the load transmission member is configured to include an inner spacer placed between the frame member and the load receiving portion in the vehicle width direction; and
   the inner spacer is not restricted by the frame member.

2. The vehicle-body front structure according to claim 1, wherein
   the load transmission member is configured to include paired projecting portions projecting inwardly in the vehicle width direction from the paired frame members, respectively, so as to be opposed to the load receiving portion placed between the paired frame members from a front side of the load receiving portion in the vehicle front-rear direction.

3. The vehicle-body front structure according to claim 2, wherein
   each of the paired projecting portions includes:
   a rear wall opposed to the load receiving portion; and
   an inclined wall which is inclined in the vehicle front-rear direction and which connects an outer part of the rear wall in the vehicle width direction to an inner wall of the frame member which is an inner part of the frame member in the vehicle width direction.

4. The vehicle-body front structure according to claim 1, wherein:
   the bumper frame portion includes paired overhanging portions that overhang on both sides in the vehicle width direction relative to the frame members; and the bumper frame portion further includes an outer spacer placed between a rear face of the overhanging portion in the vehicle front-rear direction and an outer surface of the frame member in the vehicle width direction.

5. The vehicle-body front structure according to claim 1, wherein
a portion having a lowered strength with respect to a flexural load is formed at a position in an outer portion of the frame member in the vehicle width direction that corresponds to a mounting position of the load transmission member.

6. The vehicle-body front structure according to claim 1, wherein
the load transmission member has a higher strength than the frame member.

7. A vehicle-body front structure comprising:
paired frame members elongated in a vehicle front-rear direction and arranged side by side in a vehicle width direction, the paired frame members being configured such that a load receiving portion mounted in an engine compartment is placed between the paired frame members;
a bumper frame portion elongated in the vehicle width direction and provided over front ends of the paired frame members in the vehicle front-rear direction; and
a load transmission member placed on an inner side in the vehicle width direction relative to at least one of the frame members so as to be opposed to the load receiving portion from at least one of a front side of the load receiving portion in the vehicle front-rear direction and an outer side of the load receiving portion in the vehicle width direction, the load transmission member opposing the load receiving portion within a range in a vehicle up-down direction where the load transmission member overlaps with the frame member, wherein
the bumper frame portion includes paired overhanging portions that overhang on both sides in the vehicle width direction relative to the frame members; and
the bumper frame portion further includes an outer spacer placed between a rear face of the overhanging portion in the vehicle front-rear direction and an outer surface of the frame member in the vehicle width direction.

8. The vehicle-body front structure according to claim 7, wherein
a portion having a lowered strength with respect to a flexural load is formed at a position in an outer portion of the frame member in the vehicle width direction that corresponds to a mounting position of the load transmission member.

9. The vehicle-body front structure according to claim 7, wherein the load transmission member has a higher strength that the frame member.

* * * * *